Apr. 10, 1923. 1,451,519
H. W. WILSON
ROLLING MILL COUPLING AND SPINDLE
Filed Nov. 24, 1920
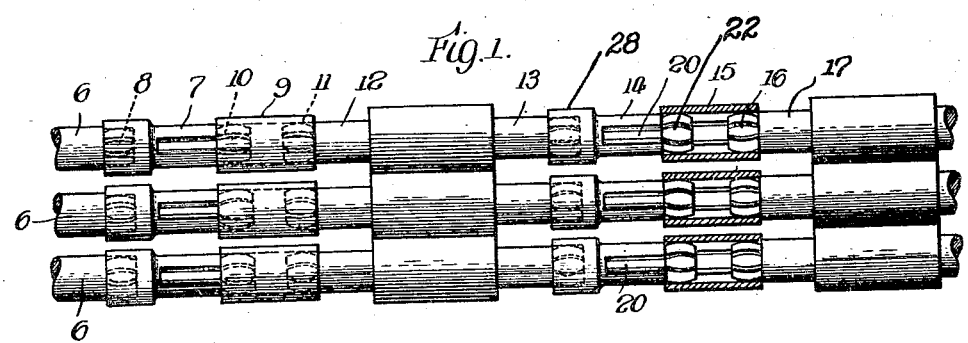
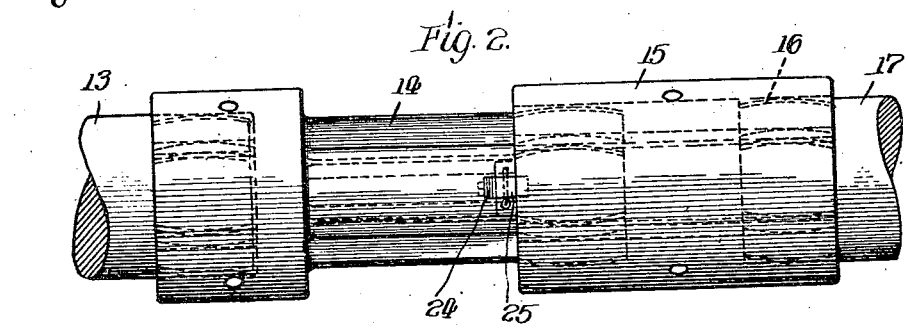
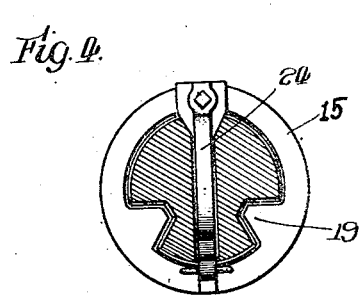
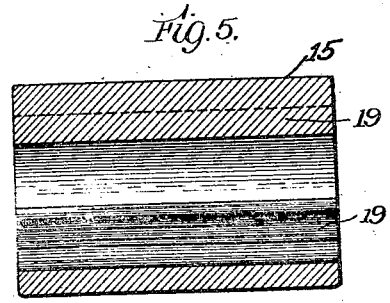
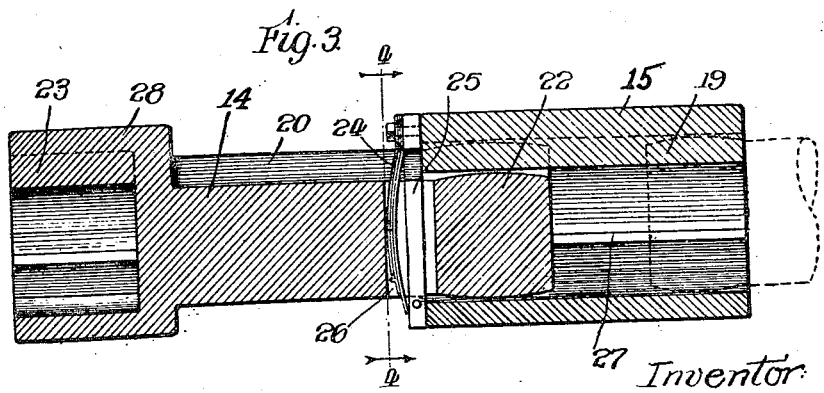
Inventor:
Henry W. Wilson,
Witness:
A. J. Sauser.
By L. Anthony Usina
Atty.

Patented Apr. 10, 1923.

1,451,519

UNITED STATES PATENT OFFICE.

HENRY W. WILSON, OF DULUTH, MINNESOTA.

ROLLING-MILL COUPLING AND SPINDLE.

Application filed November 24, 1920. Serial No. 426,172.

*To all whom it may concern:*

Be it known that I, HENRY W. WILSON, a citizen of the United States, residing at Duluth, in the county of St. Louis and State of Minnesota, have invented certain new and useful Improvements in Rolling-Mill Couplings and Spindles, of which the following is a specification.

This invention comprises a new and improved means of transmitting power from a driving member to a driven member in connection with rolling mills. More specifically it relates to means adapted to drive a wobbler upon a roll either from a wobbler upon another roll or from a wobbler upon an engine shaft or pinion.

In present rolling mill practice it is customary to drive rolls by means of what is commonly known as a spindle connected by means of couplings to the wobbler on the end of the roll neck. The wobbler which is cast on the roll neck, is in practice usually either cruciform or triangular and the coupling is internally grooved to correspond to the contour of the wobbler. The wobbler is formed with an arcuate surface so that with the coupling it forms a universal joint having a limited play. The spindle is provided with similar wobblers at either end according to the usual practice and these wobblers are similarly engaged by couplings.

Thus between a pair of adjacent rolls the power is transmitted through three members, from the driving wobbler to a coupling, thence to a spindle, thence to a second coupling, and from the second coupling to the second roll. These two duplicate couplings and the spindle when associated with the rolls provide four places for wear and for friction. Each of these four places also involves a certain amount of lost motion. In order to permit the adjustment of rolls it is necessary that this connection permit limited movement in any direction and this is taken care of by the wobbler design. A rigid connection would result in breakages.

It is an object of the present invention to provide means for connecting driving and driven wobblers, the means being such as to permit the necessary play and limited movement between the parts and being also designed to reduce the number of parts, the number of connections, and the number of engaging surfaces below those involved in the present usual construction. It is a further object to simplify the present construction and to provide a device which is readily assembled and dismantled. It is also an object to provide a connection which is simple in design and relatively inexpensive to manufacture. Other and further objects will appear as the description proceeds.

Briefly my invention involves in its more specific forms the elimination of one of the two couplings now comprised in the usual construction. This coupling is eliminated through formation of the spindle with one end according to the present usual form and with the other end enlarged and having a cup shaped recess therein similar to a coupling and adapted to engage a wobbler.

I have illustrated a preferred embodiment of my invention in the accompanying drawings in which—

Figure 1 is a somewhat diagrammatic view showing a three high two stand mill using my improved connecting means;

Figure 2 is an enlarged view of one coupling and its associated spindle;

Figure 3 is a longitudinal section of Figure 2;

Figure 4 is a section on line 4—4 of Figure 3; and,

Figure 5 is a longitudinal section through a coupling as shown in Fig. 1.

A driven shaft 6 is connected to the spindle 7 by the wobbler 8. The spindle 7 is in turn connected to the coupling 9 by the wobbler 10, the other end of the coupling receiving the wobbler 11 upon the roll neck 12. The opposite roll neck 13 is connected to the spindle 14 which latter engages the coupling 15. The coupling 15 engages the wobbler 16 upon the roll neck 17.

As shown in Figures 3, 4 and 5, the coupling 15 is provided with the inwardly extending ridges 19 which interfit with similar grooves 20 upon the spindle 14 and wobbler 22. The opposite end of the spindle 14 is provided with the cup shaped enlargement 28 having within it the ridges 23 similar to the ridges 19 upon the coupling and similarly adapted to engage the wobbler upon a roll neck or upon a driving shaft.

I have shown in the drawings a spring 24 carried by a bar 25 connected to the coupling 15. This bar and spring pass through a transverse slot 26 in the spindle and the thrust of the spring serves to yieldably maintain the coupling against its adjacent roll neck. This construction has been claimed in my co-pending application, Serial No. 427,028 filed November 29, 1920.

According to the present construction one coupling box is dispensed with, a half spindle and half coupling being in effect cast integrally as one member. That is to say, a spindle is provided having on one end a coupling box and on the other end a wobbler, thus reducing the number of parts and the number of points of wear, and of possible lost motion. It should be noted that sufficient clearance is provided at 27 in the coupling so that the spindle may be removed to the right sufficiently to clear the coupling box 28 from its associated wobbler in changing rolls.

One of the advantages of this construction lies in the fact that more clearance is obtained for making a roll change thereby lessening the time required for this operation. Further advantages lie in the fact that there is less vibration and less lost motion thus permitting the mechanism to run more quietly and securing for it longer life.

I claim:

1. In a rolling mill construction, means adapted to transmit power from a driving wobbler to a driven wobbler, comprising a coupling and a spindle associated together, the coupling consisting of a single casting having a multiplicity of straight interior projections extending longitudinally from end to end, one end being adapted to engage one wobbler, the other end being adapted to engage one end of the spindle, the other end of the spindle being adapted to engage the other wobbler.

2. In a rolling mill construction, means adapted to transmit power from a driving wobbler to a driven wobbler, the means comprising a coupling and spindle associated together in a unitary structure, the spindle having a reduced portion adapted to fit in the coupling and having an enlarged portion adapted to engage a wobbler, the other wobbler being engaged by the coupling, the opening in the large end of the spindle and that in the coupling being similar whereby the assembly is interchangeable.

3. In a rolling mill construction, means adapted to transmit power from a driving wobbler to a driven wobbler, comprising a coupling and spindle associated together, the spindle, having one female end engaging a wobbler, one male end engaging one end of a reversible coupling having two similar female ends, the other female end of the coupling engaging a wobbler.

4. In a rolling mill construction, means adapted to transmit power from a driven wobbler to a driving wobbler, said means comprising an associated coupling and spindle, the spindle having a female end adapted to receive a wobbler, and a male end provided with a rounded outer portion adapted to fit within the coupling, the rounded portion being adapted to permit the device to connect off-set wobblers, and being of similar contour to the adjacent wobbler whereby the coupling is provided with similar, reversible ends.

Signed at Duluth, Minnesota, this 15th day of November, 1920.

HENRY W. WILSON.